Figure 1:
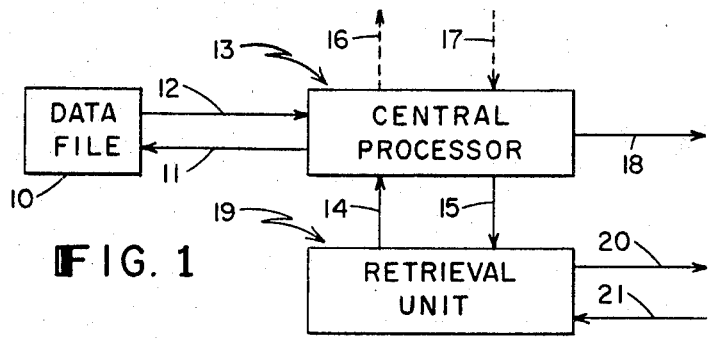

June 24, 1969　　　S. K. CHAO ET AL　　　3,451,144

FLIGHT SIMULATOR

Filed Oct. 18, 1963　　　　　　　　　Sheet 1 of 3

INVENTORS.
STANLEY K. CHAO and
JAMES E. KEARNS
BY Spencer E. Olson
ATTORNEY.

INVENTORS.
STANLEY K. CHAO and
JAMES E. KEARNS

ATTORNEY.

United States Patent Office 3,451,144
Patented June 24, 1969

3,451,144
FLIGHT SIMULATOR
Stanley K. Chao, Lexington, and James E. Kearns, Westwood, Mass., assignors to Sylvania Electric Products Inc., a corporation of Delaware
Filed Oct. 18, 1963, Ser. No. 317,197
Int. Cl. G09b 9/08
U.S. Cl. 35—10.2                 5 Claims This invention realtes generally to grounded navigation simulator/trainer apparatus and more particularly to an improved system for extending the capability of a grounded air navigation simulator/trainer.

The primary methods of airborne navigation involve the reception of signals from radio range stations, the locations of which are shown on a map carried in the airborne vehicle, and interpretation of the natural environmental elements relative to the vehicle, such as aircraft magnetic variation, wind direction, atmospheric pressure and elevation above ground terrain.

Grounded apparatus for teaching and practicing such navigation is well known to the art, and because of its economy in time and materials and the elimination of the hazards of airborne instruction, such apparatus is in widespread use. With the advent of supersonic jet aircraft and space vehicles, such grounded training apparatus has become increasingly important. This, coupled with the increased performance of the airborne vehicles, has made precise air navigation an absolute necessity since the dense traffic areas with their navigational aids place the pilot in a complex environment. A complete knowledge of this environment is essential and the pilot must be conditioned to make the best use of the equipment and facilities available to him.

The present state of the art for ground training in air navigation techniques considers only hypothetical situations usually utilizing only a limited number of fictitious ground facilities. The present art is not able to completely simulate the entire navigational environment over an actual flight plan because of the prohibitively large amount of data a computer would be required to store. The present invention contemplates a data storage and retrieval system which provides the capability for a complete simulation of all radio navigational environment and typical natural environmental conditions over any part of the globe. With this capability, a more flexible navigation training program is possible. For example, it would be possible for a student-trainee to deviate from a planned flight exercise or even to become "lost" without upsetting the training program.

It is therefore a principal object of this invention to provide the capability in a navigation simulator/trainer for a complete simulation of all the radio navigation environment over any part of the globe.

It is an additional object of this invention to provide a system capable of simulating typical natural environments over any part of the glome.

It is a further object of this invention to provide a navigation simulator/trainer system capability which allows a student-trainee to deviate from a planned simulated flight without upsetting the flight simulation program.

Briefly the invention resides in the recognition that a simulated aircraft in simulated flight is, at any one time, within radio range of only a small number of the totality of radio navigation stations it will encounter during a cross-country or global flight. Similarly, the natural environmental conditions encountered at any one time are completely localized. Thus, the amount of data required at any one time is minimal in comparison to the total amount of data necessary to simulate the entire flight. According to this invention, only the data which is within range of the simulated computer is stored in the simulator. All other information is stored in an external data file with means provided to bring additional data into the simulator as the simulated aircraft comes within range of such data. At the same time, data which is no longer within range of the simulated aircraft is deleted from the simulator storage.

Basic to the invention is the concept of the navigation grid system. Using this concept, the entire globe, or any part of the globe, is divided into a multiplicity of Navigation Blocks, with each Navigation Block identified by a code number. In a typical example, the globe is divided by longitude and latitude, each Navigation Block having bounds one-half degree by one-half degree. In this manner, the continental United States, which is approximately thirty degrees by sixty degrees, may be divided into roughly seventy-two hundred Navigation Blocks, each Block being approximately thirty miles square. Each Navigation Block contains the data for all radio navigation stations located in the area bounded by the Block. Using this concept, a complete global mapping may be stored in the external data file.

Since it is also realized that various searching and processing routines become burdensome on the computer of a simulator system, this invention provides a central processor, which uses both general and special purpose instructions, and a real time retrieval unit, which relieve the simulator's computer of the aforementioned burdensome routines. From the following description, it will be seen that the invention can be used to provide navigation simulation only, or to provide the navigation simulation for a complete flight simulator system.

The invention will be illustrated by the descirption of a specific embodiment wherein the object is to locate all radio navigational aid stations of a predetermined frequency, within radio range of the simulated aircraft. This corresponds to the situation where the student-trainee tunes a radio receiver to a particular frequency. The invention will be further described by illustrating the retrieval of information from the data file, when the simulated aircraft comes within range of new data.

Figure 2:
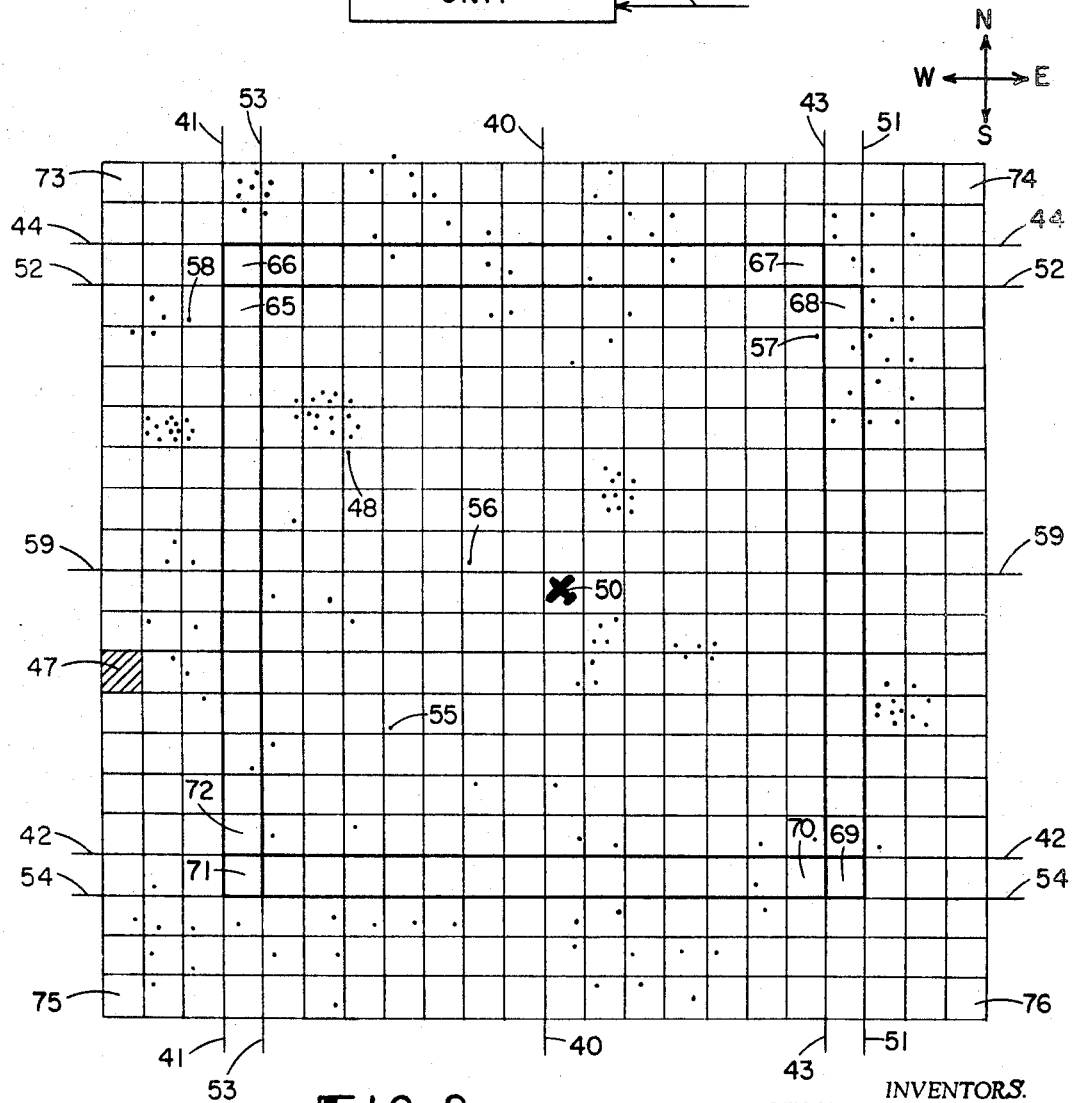
Figure 3:
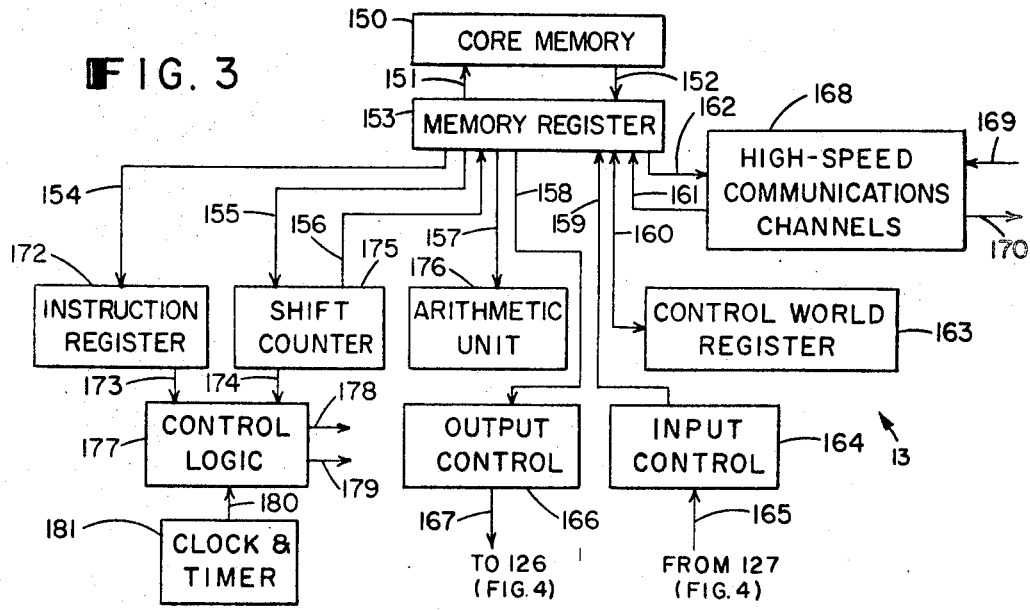
Figure 4:
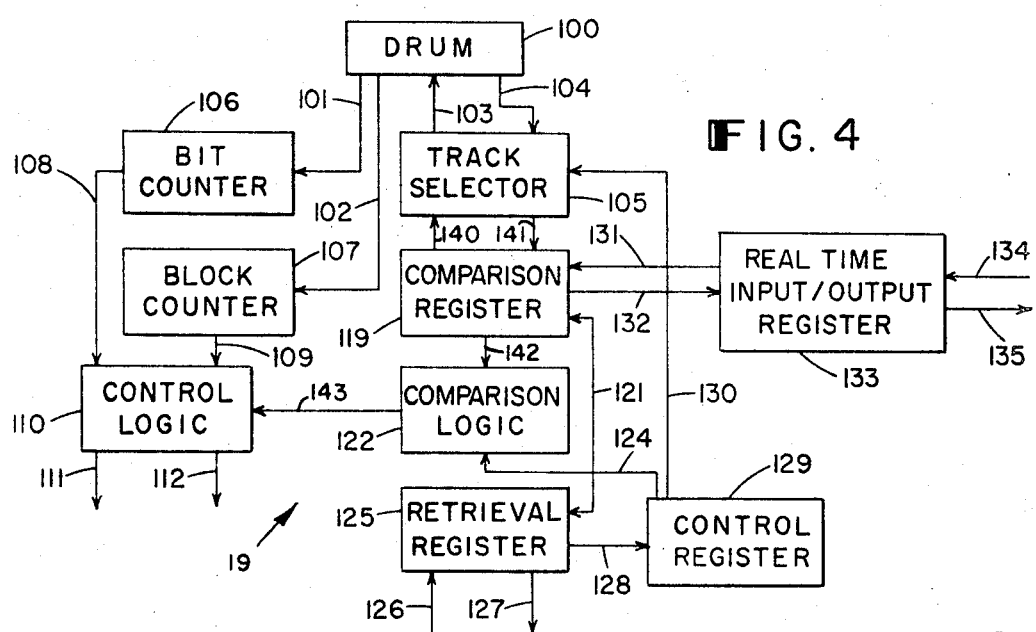
Figure 5:
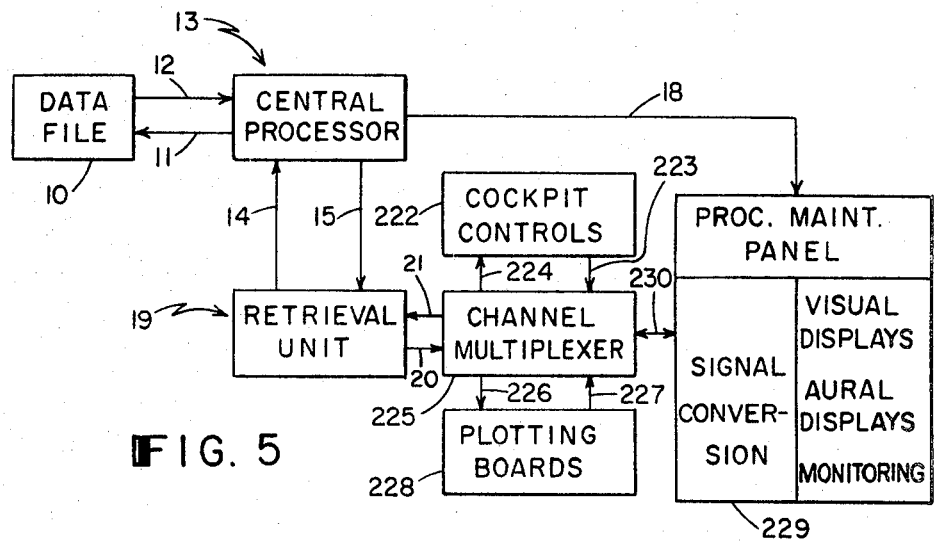
Figure 6:
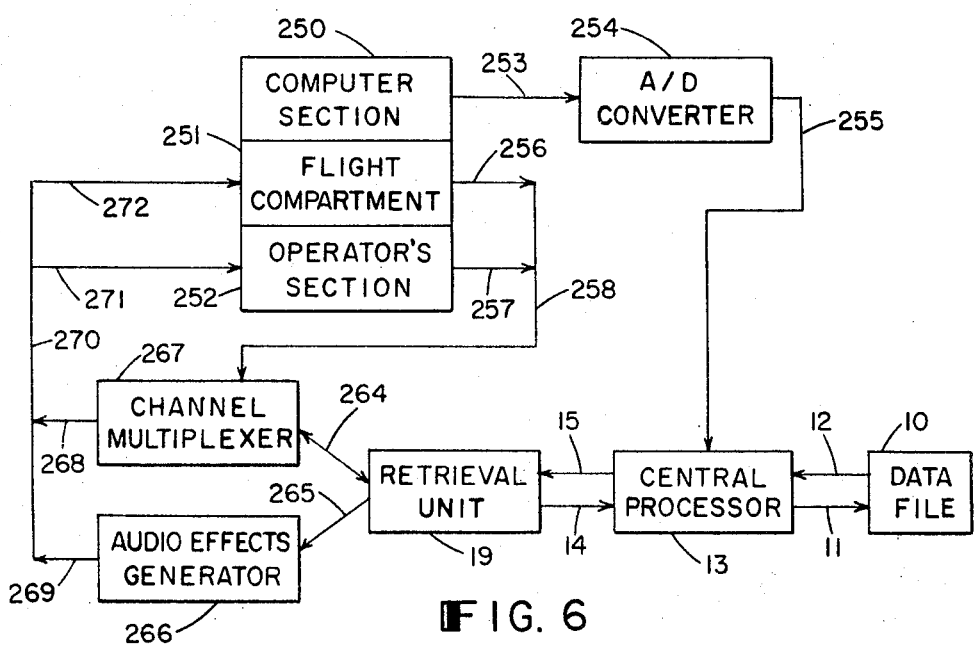

The foregoing and other objects, features and advantages of the invention, and a better understanding of its construction and opeartion will become apparent from the following detailed description, taken in conjunction with the accompanying drawings, in which:

FIG. 1 is a system block diagram of the invention;
FIG. 2 is a graphical representation of the navigation grid system concept of the invention;
FIG. 3 is a block diagram of the central processor of the system of FIG. 1;
FIG. 4 is a block diagram of the retrieval unit of the system of FIG. 1;
FIG. 5 is a block diagram of a navigational training system incorporating the invention; and
FIG. 6 is a block diagram of a flight simulator system incorporating the invention.

Referring to FIG. 1, the invention generally comprises a data file 10, a central processor 13, and a retrieval unit 19. The data file 10, using the navigation grid concept illustrated in FIG. 2, stores all data relative to any geographical area, and the central processor 13 extracts therefrom over a line 12 all data which is within range of a simulated aircraft and transfers such data by means of a line 15 to the retrieval unit 19 where it is stored until such time as it is needed. The transfer of data from the data file 10 is initiated by signals appearing on line 14 interconnecting the central processor 13 and the retrieval unit 19 and on a line 11 interconnecting the central processor 13 and the data file 10. Communication of the various apparatus shown in FIG. 1 with external apparatus is effected by signals on an input line 21 and an output line 20. Lines 16 and 17 are provided to permit real-time communication between the central processor 13 and suitable high-speed communication equipment, for example, a flight simulation computer. As the simulated aircraft comes within range of new data, the central processor 13 extracts such data from the data file 10, transfers it to a storage section of the retrieval unit 19, and simultaneously deletes from the storage section all data which is no longer within range of the simulated aircraft. The central processor program contains general purpose and special purpose instructions giving the central processor the capability of solving any navigation simulation problem. The central processor 13 delivers output signals over a line 18 to display equipment or to a central computer. The central processor 13 also initiates search routines in the retrieval unit 19, which performs the information retrieval function independent of the operational program and is capable of retrieving station data based on frequency, call letters, or Navigation Block number. In addition, the retrieval unit serves as a buffer for data being fed to the central processor for other simulation equipment.

Referring now to FIG. 2, the navigation grid concept consists of dividing a geographic area into blocks, typically into blocks of one-half degree longitude by one-half degree latitude. These blocks, such as the one identified by numeral 47, are called Navigation Blocks, each being identified by a block number. There are various ways of identifying the navigation blocks, one being to give each block a row number and a column number. For example, let the block indicated by numeral 73 be identified as row one column one ($RW_1$, $CL_1$). Then the block indicated by numeral 75 is identified as row twenty-one, column one ($RW_{21}$, $CL_1$); the block indicated by numeral 74 is identified as row one, column twenty-two ($RW_1$, $CL_{22}$); the block indicated by numeral 76 is identified as row twenty-one, column twenty-two ($RW_{21}$, $CL_{22}$); and so on. Each navigation block contains all the navigational and environmental data associated with the specific geographical area including a description of all radio navigation facilities located within the area, such as shown by dots at 48, 55, 56, 57 and 58, and information describing magnetic variation, terrain elevation, assigned atmospheric pressure, wind conditions and other environmental conditions. Using this concept, entire navigation maps are stored on tape and constitute the data file. For example, a map of the continental United States encompasses an area approximately 30° by 60° which would be seventy-two hundred navigation blocks, each approximately thirty miles square. If the simulated aircraft 50 has a maximum radio range of two hundred miles, it is effectively centered in an array of navigation blocks of fifteen rows and fifteen columns, which corresponds to the two hundred and twenty-five blocks within the bounds of lines 51, 52, 53 and 54. As was mentioned earlier, these blocks of information data are stored in the retrieval unit 19. Now, if the simulated aircraft moves in a northerly direction and crosses boundary 59, a group of fifteen blocks of new data bounded by lines 51, 52, 53, and 44 are read from the data file into the retrieval unit via the central processor, and the row of blocks bounded by lines 51, 53, 54 and 42 are deleted from the retrieval unit. Similarly, if the simulated aircraft moves in a westerly direction and crosses boundary 40, a new column of blocks bounded by lines 41, 53, 52, and 54 is read into the retrieval unit, and the column of blocks bounded by lines 43, 51, 52 and 54 are deleted. In the worst case, the simulated aircraft would cross the intersection of two boundaries causing thirty new blocks of data to be transmitted to the retrieval unit. With this technique, the simulator always maintains a maximum range of at least two hundred miles with a minimum simulator storage capacity.

The central processor 13, shown in block diagram form FIG. 3, is a small scale, stored-program digital data processor of universal design. It is comprised functionally of a core memory 150, a memory register 153, an instruction register 172, a shift counter 175, an arithmetic unit 176, a plurality of high speed communications channels 168, a control word register 163, control logic 177, clock and timer 181, input control 164 and output control 166. As shown by FIG. 3, the core memory 150 is interconnected with the memory register 153 by a pair of lines 151 and 152. The memory register 153 is interconnected with the instruction register 172, shift counter 175, arithmetic unit 176, output control 166, input control 164, control word register 163, and the high-speed communications channels 168 by means of a plurality of individual lines 154, 155, 156, 158, 159, 160, 161 and 162. As further shown, the controllogic 177 is adapted to receive input signals over lines 173, 174 and 180 and to provide signals on lines represented by 178 and 179 to control the operation of various parts of the central processor.

As mentioned previously, the central processor 13 may be used as the control element in an independent navigation simulation system, or as an "off-line" control processor in a large flight simulation complex. The core memory 150 of the central processor 13 would, in a typical case, have a four thousand and ninety-six word storage capacity with a read-write cycle time of four microseconds. The input and output are handled through the use of control words in the control word register 163. During input-output operation the control word is stored in the control word register 163 while the input-output characters are being assembled in the memory register 153. In a typical case, the central processor 13 has a repertoire of fourteen instructions of either a general-purpose or special purpose nature. The central processor 13 is capable of carrying out all computations necessary to the solution of a simulation problem and has the capability of searching the data file 10 to obtain additional information when required for updating the storage memory in the retrieval unit 19. In addition, the core memory 150 stores the location of each navigation block stored in a retrieval unit drum 100, FIG. 4. The central processor 13 receives inputs represented by a line 165 via the input control 164 from the data file 10, the retrieval unit 19 and, if required, from an external computer. It provides output signal to a line 167 via the output control 166 to the data file 10, the retrieval unit 19 and other peripheral simulator equipment. It has the further capability of providing outputs on a line 170 and of receiving inputs on a line 169 from any required high speed communications equipment via the high speed communications channels 168. Since the central processor 13 contains an internal clock and timer 181 and contains its own control logic 177, it operates independently of any external equipment.

The basic functions of the retrieval unit 19, shown in block diagram form in FIG. 4, are to store the data which is within range of the simulated aircraft and to retrieve the requested data on command of the central processor 13. The retrieval unit 19 consists of a storage drum 100, a bit counter 106, a block counter 107, control logic 110, a track selector 105, a comparison register 119, a real time input/output register 133, comparison logic 122, a control register 129, and a retrieval register 125. As shown by FIG. 4, the drum 100 is coupled to the bit counter 106 and to the block counter 107 by lines 101 and 102, respectively. The counters 106 and 107 are coupled to the control logic 110 by means of lines 108 and 109 and operate the control logic 110 to provide control signals on lines 111 and 112 upon receipt of an appropriate signal on a line 143 from the comparison logic 122, as will be more fully apparent hereinafter. The drum is further coupled to the track selector 105 by lines 103 and 104.

The comparison register 119 is coupled to the track selector 105 by means of a pair of lines 140 and 141, to the real time input/output register 133 by a pair of lines 131 and 132, to the comparison logic 122 by a line 142, and to the retrieval register 125 by a line 121. The control register 129 is adapted to receive over a line 128 data from the data file 10 and the central processor 13 appearing on a line 126 and to transfer the data to the comparison logic 122 by a line 124. Signals are applied to the track selector 105 by a line 130. Output signals from the retrieval unit 19 are provided by the retrieval register 125 on a line 127 to the central processor 13 and to the data file 10. Communication of the retrieval unit 19 with external apparatus, for example, a multiplexer, (FIG. 5), is also provided by means of lines 134 and 135.

The retrieval unit 19 is so organized that it can perform the data retrieval function independent of the central processor's operational program. It also acts as a buffer between the central processor 13 and other simulator equipment. The primary element of the retrieval unit is the storage drum 100, which in a typical embodiment, rotates at a rate of thirty-six hundred revolutions per minute and has a storage capacity of 154,880 bits.

On the drum 100 is stored all environmental data and all the parameters of the radio navigation stations which are within range of the simulated aircraft 50, FIG. 2. The retrieval unit 19 retrieves data from the drum 100 based on station frequency, station call letters or Navigation Block number, based on the criteria set forth by the central processor 13. As with the central processor, the retrieval unit 19 contains its own counters, 106 and 107, and its own control logic 110, thereby giving it an independent search capability. The retrieval unit 19 has the option, under control of the program, to cease searching when the first match is found or to continue searching for all data satisfying the given search criteria. In this way, the characteristics of co-channel interference (two or more stations operating on the same frequency and within range of the simulated aircraft) can be duplicated. The operation of the apparatus shown in FIG. 4 will be described more fully hereinafter in conjunction with a specific illustration of the operation of the invention.

FIG. 5 shows in block diagram form a navigational simulator/trainer system based on the invention, consisting of the previously described data file 10, control processor 13 and retrieval unit 19 subsystem of FIG. 1 in combination with a channel multiplexer 225, cockpit controls 222, plotting boards 228, and a process maintenance panel 229. As shown by FIG. 5, the channel multiplexer 225 is coupled to the cockpit controls 222 by a pair of lines 223 and 224, to the plotting boards 228 by a pair of lines 226 and 227, to the retrieval unit by means of lines 20 and 21, and to the process maintenance panel 229 by means of a line 230. The cockpit controls 222 are controlled by the student-trainee and include the navigational aids of the simulated aircraft. The plotting boards 228 record the progress of the simulated flight, and the maintenance panel 229 is controlled by the instructor. The panel 229 contains means for monitoring the performance of the student-trainee, including displaying of all visual and aural signals received by the student-trainee. The channel multiplexer 225 multiplexes the information input to the retrieval unit 19 from the cockpit controls 222, the maintenance panel 229 and the plotting boards 228 and also distributes the information output from the retrieval unit 19 to these units. As mentioned previously, the central processor 13 receives data inputs from the retrieval unit 19 and the data file 10. After performing the necessary computations, the central processor 13 supplies output signals to the various units via the retrieval unit 19 and the channel multiplexer 225 or sends signal information directly to the maintenance panel 229 by means of the line 18.

A complete flight simulator system employing the invention is shown in FIG. 6. The main flight simulator section is comprised of a computer section 250, a flight compartment 251 and an operator's section 252. The system further includes an audio effects generator 266, a channel multiplexer 267 and the previously described data file 10, central processor 13 and retrieval unit 19. In addition, through the use of an A/D converter 254, coupled to the computer section 250 by a line 253 and to the central processor 13 by a line 255, the invention is compatible with a simulator system wherein the main computer of the computer section 250 is an analog computer. In this system, the retrieval unit 19 supplies signals over line 265 to the audio effects generator 266, the output of which is applied over a line 269 and a line 272 to the flight compartment 251 and over a line 271 to the operator's section 252. Signals from the flight compartment 251 and the operator's section 252 are transmitted over lines 256, 257 and 258 to the retrieval unit 19 via the channel multiplexer 267 and a line 264. The channel multiplexer 267 also distributes output signals received from the retrieval unit 19 on the line 264 to the flight compartment 251 and the operator's section 252 by means of lines 268, 271 and 272.

Using the embodiment of the invention as shown in FIG. 5, with references to FIGS. 2, 3 and 4, the following detailed description illustrates the updating of the retrieval unit storage drum 100 by bringing in to the retrieval unit 19 from the data file 10 new blocks of data which come within range of the simulated aircraft 50. This description utilizes the previously described method of identifying the navigation blocks of the navigation grid system and in this respect the system program is based upon this method of identification. However, it will be readily obvious to ones skilled in the art that the system program is easily varied to be compatible with any alternate method for identifying the navigation blocks of the navigation grid system. In this embodiment, the rows are numbered from north to south and the columns are numbered from west to east. When the simulated flight carries the simulated aircraft 50 across a column boundary in an easterly direction, a positive signal is generated indicating that an eastern column is to be introduced into the retrieval unit storage which replaces the most western column in the storage. When a boundary to the west is crossed, a negative signal is generated indicating that a new western column of blocks is to replace the most eastern column of blocks in the storage. In a similar manner, when a row boundary is crossed in a southerly direction, a positive signal is generated instructing the replacement of the most northern row of blocks by a southern row of blocks and when a row boundary is crossed in a northerly direction a negative signal is generated indicating the replacement of the most southern row of blocks in the storage by a northern row of blocks. To illustrate, assume that the simulated aircraft 50 as seen in FIG. 2 is located in the navigation block row eleven, column twelve ($RW_{11}$, $CL_{12}$). The navigation blocks stored in the retrieval unit are those blocks bounded by lines 51, 52, 53 and 54 ($RW_4$ to $RW_{18}$ and $CL_5$ to $CL_{19}$). Now, the simulated aircraft 50 flying in a westerly direction, crosses the column boundary line 40, entering the navigation block $RW_{11}$, $CL_{11}$ and an negative signal is generated at the plotting board 228 which is transmitted via the channel multiplexer 225 and the retrieval unit 19 by lines 21 and 14 to the central processor 13. This negative signal also contains information that a column boundary has been crossed. The program of the central processor 13 initiates a search of the data file 10 until the navigation block $RW_4$, $CL_4$, indicated by the numeral 65, is located. Next, the central processor 13 reads in from the data file 10 the data from navigation block $RW_4$, $CL_4$ and the next fourteen blocks of data under column four. These new blocks of data replace the blocks of data under column nineteen in the retrieval unit storage with navigation block $RW_4$, $CL_4$, indicated by the numeral 65, replacing the navigation block $RW_4$, $CL_{19}$, indicated by the numeral 68, and so on until the navigation block $RW_{18}$, $CL_{19}$, indicated by the numeral 69, is replaced by the navigation block $RW_{18}$, $CL_4$, indicated by the numeral 71. This completes the updating of the retrieval unit storage with the new boundary of blocks stored therein, namely, those within the lines 43, 52, 41 and 54.

Next, assume that the simulated aircraft, moving in a northerly direction, crosses the boundary line 59. Again, a negative signal is generated, but now indicating that a row boundary has been crossed. When this signal reaches the central processor 13, a search of the data file 10 is initiated until the navigation block $RW_3$, $CL_4$, indicated by the numeral 66, is located. The central processor 13 then reads in from the data file 10 the data from navigation block $RW_3$, $CL_4$ and the next fourteen blocks of data in row three. This new row of blocks replaces the blocks in row eighteen, with the navigation block $RW_3$, $CL_4$, indicated by the numeral 66, replacing the navigation block $RW_{18}$, $CL_4$, indicated by the numeral 71, and so on until the navigation block $RW_{18}$, $CL_{18}$, indicated by the numeral 70, is replaced by the navigation block $RW_3$, $CL_{18}$, indicated by the numeral 67. This completes the updating of the retrieval unit storage after the aircraft, moving in a northerly direction, has crossed the boundary line 59. All navigation blocks bounded by the lines 43, 44, 41, and 42 are now located in storage.

As metioned previously, the retrieval unit 19, acting upon a command of the central processor 13, can perform a data retrieval function based on station frequency, station call letters or Navigation Block number, the retrieval being performed independently of the central processor's operational program. To illustrate this capability of the invention, the following detailed description is presented wherein the object is to retrieve the data on all radio stations transmitting on a predetermined frequency, which are within range of the simulated aircraft 50. For this illustration, it is assumed that any desired frequency is uniquely coded as a thirteen bit binary word. The purpose of such a retrieval is to provide the central processor 13 with the data necessary to simulate a response to the situation where a radio receiver of the simulated aircraft is tuned to a particular frequency. Such a retrieval is initiated upon receipt by the central processor 13 of a signal from the cockpit controls 222 via the channel multiplexer 225 and the retrieval unit 19, indicating that a receiver is tuned to the frequency of interest. Upon receipt of this signal, the central processor 13 transmits to the retrieval unit 19 the above-mentioned frequency with the instruction to search the storage drum 100, FIG. 4, for all stations having this frequency. The thirteen bit binary word identifying the frequency is stored, via the retrieval register 125, in the control register 129. The retrieval register 125 sends a signal to the comparison register 119 indicating that the search criteria is the aforementioned frequency. The search routine is then begun, always starting from the beginning of the station data and searching through continually for stations, searching one block at a time. When the first station data is sent to the comparison register 119, the comparison register extracts the frequency data for that station, transferring this data to the comparison logic device 122. At the same time, the search frequency data is sent from the control register 129 to the comparison logic device 122. If the compared frequencies are the same, a signal is sent to the control logic circuit 110 which causes all data pertaining to that station to be transferred from the comparison register 119 to the retrieval register 125, where it is held until the search of all navigation blocks is completed. At the same time, a signal is sent from the control logic 110 to the drum 100 causing the data for the next station on the drum to be transferred to the comparison register 119. If the compared frequencies are not the same, there is no transfer of data from the comparison register 119 to the retrieval register 125 and the next station data is read in from the storage drum 100. This process is repeated until such time as an entire Navigation Block has been searched, at which time the block counter 107 is advanced by one and the search routine moves on to the next block of data stored on the drum. The process is continued until the block counter 107 indicates that all Navigation Blocks stored on the drum 100 have been searched. At this time, a signal is sent to the control logic 110 indicating that the search is completed. The control logic 110 transmits a signal to the central processor 13 indicating the completion of the search. As mentioned above, each station whose frequency is the same as that of the search criteria frequency has all its associated navigational data transferred to the retrieval register 125. The central processor 13 may now extract this data from the retrieval register 125, this being the data for all radio stations within range of the simulated aircraft 50 having the selected frequency. The central processor 13 then performs the necessary computations on this station data, sending the resultant output to the associated aural and visual indicators located in the display panel 229, FIG. 5. While this illustration is related only to a search of radio stations having a particular frequency, it is readily obvious that a similar search could be made based on a search criteria of station call letters or of Navigation Block number.

As mentioned previously, the foregoing illustrations relate only to typical examples of the capabilities of the invention. It will be readily obvious to one skilled in the art that minor variations may be made without departing from the spirit of the invention, and it is therefore intended that the invention not be limited to the specifics of the preceding description of preferred embodiments, but rather to embrace the full scope of the following claims.

What is claimed is:

1. A simulator system wherein data concerning a substantial geographical area is required for a simulation exercise but at any instant of time only data relative to a sub-area of said geographical area is needed, comprising: first data storage means arranged to store data concerning all of said geographical area in a plurality of data blocks corresponding to sub-areas of said geographical area bounded by latitudinal and longitudinal boundaries, each of said data blocks having a unique ientifying number, a retrieval unit including second data storage means arranged to store in an array of rows and columns blocks of data concerning those sub-areas which at any instant of time are needed for the simulation exercise; a central processor; means connecting said central processor to said first data storage means and to said retrieval unit; and means operative in response to the progress of the simulation exercise for providing to said retrieval unit a signal indicative that a new sub-area of coverage has come within the requirements of the simulation exercise, said retrieval unit in combination with said first data storage means and said central processor being operative in response to said signal to cause data blocks representing the new area of coverage to be transferred to said second data storage means from said first data storage means.

2. An aircraft simulator system comprising:
first storage means adapted to store data representative of environmental conditions over a geographical area;
means for simulating an aircraft responsive to simulated flight conditions and having a range encompassing environmental conditions over a portion of said geographical area when in a first simulated flight position;
second storage means adapted to store data representative of the environmental conditions over the portion of said geographical area within the range of said aircraft simulating means when in said first flight position;
means for simulating a change in the position of said aircraft simulating means from said first simulated flight position to a second simulated flight position within said geographical area; and
means responsive to the simulated change in flight position of said aircraft simulating means to replace all data representative of environmental conditions over the portion of the geographical area stored by said second storage means no longer within the range of said aircraft simulating means with data from said first storage means representative of environmental conditions over the portion of the geographical area brought within the range of said aircraft simulating means by the simulated change in position from said first simulated flight position to said second simulated flight positions.

3. An aircraft simulator system comprising:

first storage means for storing data representative of environmental conditions over an area of the world over which a simulated flight is to be flown, said area being divided into a plurality of sub-areas defined by a grid of row and column boundaries;

means for simulating an aircraft responsive to simulated flight conditions and having a range encompassing environmental conditions over fewer than all of said sub-areas when the flight position of the aircraft simulting means is in a first sub-area;

second storage means for storing data representative of environmental conditions over said fewer than all of said sub-areas within the range of said aircraft simulating means when in said first sub-area;

means for simulating a change in the flight position of said aircraft simulating means from the first sub-area to a second sub-area whereby a row or column boundary is crossed; and means responsive to the simulated change in flight position of said aircraft simulating means to selectively transfer from said first storage means to said second storage means new data representative of environmental conditions within a respective row or column of said sub-areas.

4. A navigation simulator-trainer comprising:

first data storage means for storing data representative of natural and radio navigation environments of a selected geographical area, said area being divided into a plurality of sub-areas by latitudinal and longitudinal boundaries, each sub-area having an identifying number, and said first data storage means being adapted to store data representative of the environments present in the sub-areas in correspondingly identified blocks of data;

means for simulating an airborne vehicle responsive to natural and radio navigation environments and having a range encompassing environmental conditions over fewer than all of said sub-areas;

a retrieval unit including a second data storage means for storing the data representative of environmental conditions over fewer than all of said sub-areas; said data being stored in arrays of rows and columns of the aforementioned blocks of data;

means for simulating a change in the flight position of said airborne vehicle simulating means from a first sub-area to a second sub-area whereby a latitudinal boundary and a longitudinal boundary are crossed; and means responsive to the simulated change in flight position to transfer from said first data storage means to said second data storage means a new column and a new row of data.

5. An aircraft simulator system comprising:

first data storage means adapted to store, in blocks corresponding to sub-areas of an area of the world over which a simulated flight is to be flown, data representative of the environments present in said sub-areas;

aircraft simulating means having a particular simulated range encompassing a predetermined number of sub-areas;

a retrieval unit including a second data storage means adapted to store a number of blocks of data representing environmental conditions corresponding to the number of sub-areas within the simulated range of the aircraft simulating means;

means for simulating a change in the flight position of said aircraft simulating means from a first sub-area to a second sub-area; and means responsive to the simulated change in flight position from said first sub-area to said second sub-area to remove from said second storage means data representative of environmental conditions rendered out of the simulated range of the aircraft simulating means by reason of said change in flight position, and to transfer from said first storage means to said second storage means data representative of environmental conditions brought into the simulated range of the aircraft simulating means by reason of said change in its simulated flight position.

References Cited

UNITED STATES PATENTS

| | | | |
|---|---|---|---|
| 3,037,699 | 6/1962 | Lee et al. | 35—12 |
| 3,061,192 | 10/1962 | Terzian | 340—172.5 |
| 3,064,471 | 11/1962 | Pierce | 35—12 |

OTHER REFERENCES

Dunn, W. H. et al.: A Digital Computer for Use in an Operational Flight Trainer, in IRE Transactions, June 1955, pp. 55–63.

MALCOLM A. MORRISON, *Primary Examiner.*

JOSEPH F. RUGGIERO, *Assistant Examiner.*

U.S. Cl. X.R.

35—12; 235—184